US005549031A

United States Patent [19]

Giordano

[11] Patent Number: 5,549,031

[45] Date of Patent: Aug. 27, 1996

[54] DEVICE FOR DISTRIBUTING OIL UNDER PRESSURE AND HYDRAULIC HAMMER PROVIDED WITH SAID DEVICE

[75] Inventor: Salvatore Giordano, Bitonto, Italy

[73] Assignee: Officine Giordano S.R.L., Bitonto, Italy

[21] Appl. No.: 459,169

[22] Filed: Jun. 2, 1995

[30] Foreign Application Priority Data

Jun. 15, 1994 [IT] Italy ................................ MI94A1248

[51] Int. Cl.$^{6}$ ............................ F01L 25/02; B23B 45/04

[52] U.S. Cl. ................................ 91/284; 91/290; 91/303; 91/304; 91/319; 173/169; 173/206

[58] Field of Search ............................ 91/218, 281, 289, 91/290, 293, 303, 304, 319; 60/369; 173/169, 168, 206, 207, 208

[56] References Cited

U.S. PATENT DOCUMENTS

| | | | |
|---|---|---|---|
| 614,160 | 11/1898 | Breitenstein | 173/168 X |
| 3,490,549 | 1/1970 | Catterson . | |
| 3,701,386 | 10/1972 | Feucht . | |
| 3,908,767 | 9/1975 | Klemm | 91/290 X |
| 4,852,664 | 8/1989 | Terada et al. | 173/206 |
| 5,038,668 | 8/1991 | Arndt et al. | 91/290 |

FOREIGN PATENT DOCUMENTS

| | | | |
|---|---|---|---|
| 640868 | 1/1937 | Germany | 173/206 |
| 643099 | 3/1937 | Germany | 173/206 |
| 1940836 | 2/1970 | Germany . | |
| 439599 | 8/1974 | Germany | 173/206 |
| 962457 | 9/1982 | U.S.S.R. | 173/206 |

*Primary Examiner*—Hoang Nguyen

*Attorney, Agent, or Firm*—Panitch Schwarze Jacobs & Nadel, P.C.

[57] ABSTRACT

A device for distributing oil under pressure including a head (2) within which, inside a chamber (24), a shuttle (5) slides provided with a shank (**5*a*) sealingly sliding within an end cap (6) and on whose head surface (19) oil at the feed pressure acts coming from a switch duct (18). The head (2) is provided with a feed hole (8) connected to the chamber (24) and is closed at the other end by a shutter (7) connected to a drain hole (9), while the shuttle (5) is provided with an inner cavity (26) and end ducts (25) and it is shaped so as to have in the chamber (24) opposite transverse surfaces (22, 23) whose difference of area in favour of the surface (23) at the end where the shank (5*a*) is located is smaller than the area of the head (19) of the latter. A hydraulic hammer including the device is provided with a pair of outflow orifices (17, 20) located so that the first orifice (17) is uncovered by the ram (4) at the end of the return travel and the second orifice (20**) at the end of the descending travel.

6 Claims, 5 Drawing Sheets

DEVICE FOR DISTRIBUTING OIL UNDER PRESSURE AND HYDRAULIC HAMMER PROVIDED WITH SAID DEVICE

The present invention relates to devices for distributing oil under pressure, and in particular to a device suitable to control the distribution of oil under pressure in a hydraulic hammer.

It is known that a hydraulic hammer essentially consists of a cylinder with a piston, or ram, sealingly sliding therein which is shot downwards to strike the demolition tool, and is then taken back upwards to carry out a new operating cycle. This reciprocating motion of the ram is controlled by a distribution device which connects the blast chamber, i.e. the portion of cylinder above the ram, alternately with the high-pressure circuit and the drain circuit.

The members which make up the distribution device undergo significant stress and wear, thus requiring a frequent maintenance. One of the main drawbacks of conventional demolishing hammers is the poor accessibility of said members, which involves a considerable waste of time for the frequent disassembling and re-assembling of the hammer as mentioned above. A further drawback stems from the extreme care required during the maintenance operations of said members, which usually will come into contact with the ram. Therefore, they have to be machined with high precision and very low tolerances, in order to reduce friction and prevent tightness problems.

The trouble coming from these drawbacks has already been dealt with and satisfactorily solved in the Italian patent n. 1.236.263 filed by the same applicant. Said patent discloses a hydraulic hammer wherein the distribution members are mounted in such a position as not to come in contact with the ram and to be promptly accessible from outside, without requiring the disassembly of the whole hammer. In this way, the stresses on the distribution device are reduced and it is not necessary to enter the cylinder to carry out the maintenance. These objects are achieved by means of a distribution device, positioned above the cylinder, consisting of a shuttle and a control valve which controls the latter for the alternate connection to the blast chamber, as mentioned above. Though this solution reduces the number of interconnected mechanical members affected by maintenance, nonetheless it is susceptible of further simplification and reduction.

Therefore, the object of the present invention is to provide a simplified distribution device in which the number of members and ducts making up the device is reduced further.

This object is achieved by means of a device having the characteristics cited in claim 1.

It is apparent that the simplification of the device, through the elimination of the control valve, reduces both the manufacturing and the maintenance costs of the hammer provided with said device. Furthermore, the elimination of a member potentially subject to failure increases the reliability of the device.

These and other advantages and characteristics of the device according to the present invention, and of the hammer provided with said device, will be apparent from the following detailed description of a preferred embodiment thereof, reported as a non-limiting example, referring to the annexed drawings wherein.

Figure 1:
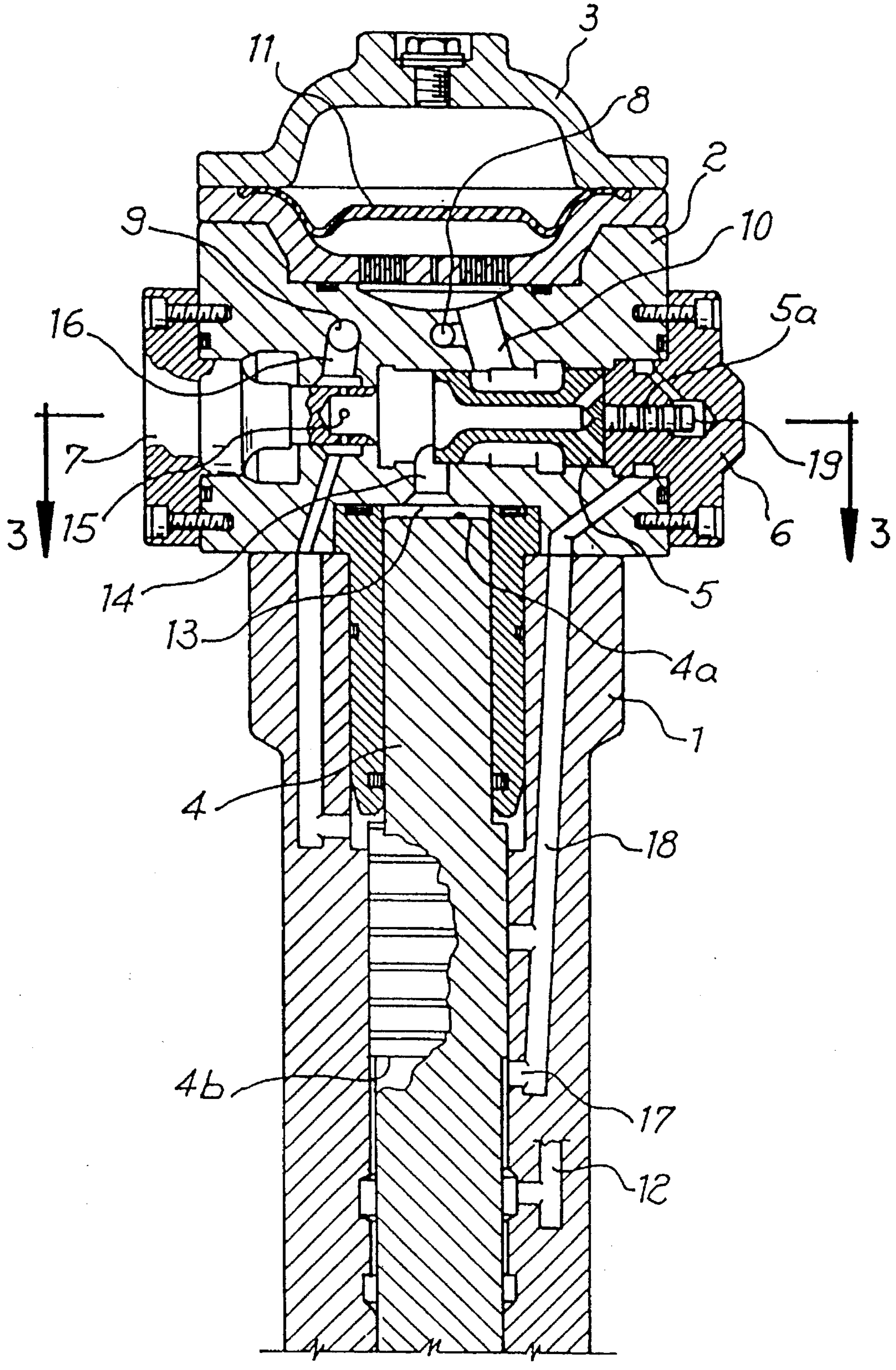
FIG. 1 is a schematic partially sectional longitudinal view of the hammer according to the present invention, with the ram at the top dead center in the position of cycle start.

Referring to FIG. 1, there is seen that a hydraulic hammer according to the present invention essentially includes a cylinder 1 closed at the top by a head 2, containing the distribution members, and a membrane accumulator 3 located above head 2.

A piston or ram 4, driven by the oil pressure acting alternately on a top circular surface *4a* thereof and on a bottom annular surface *4b* thereof, reciprocates within cylinder 1. The alternate distribution of oil is carried out by means of a horizontal shuttle 5, enclosed within head 2 by a cap 6 at one end and a shutter 7 at the other end. Shuttle 5 is provided with a shank *5a* sealingly sliding within cap 6. The oil under pressure enters the distribution device through a feed hole 8, and is drained therefrom through a drain hole 9. Both these holes, for the sake of clarity, are drawn higher than shuttle 5 but they are actually at the level of line 3—3, as it results clearly from FIG. 3.

When shuttle 5 is positioned on the right as in FIG. 1, a portion of the oil under pressure entering through hole 8 goes towards accumulator 3 through an inlet duct 10 and raises membrane 11 of accumulator 3 which is thus charged. The remaining portion of the oil under pressure makes ram 4 reascend by entering the lower part of cylinder 1 through a return duct 12, so as to act on the bottom annular surface *4b*.

Figure 2:
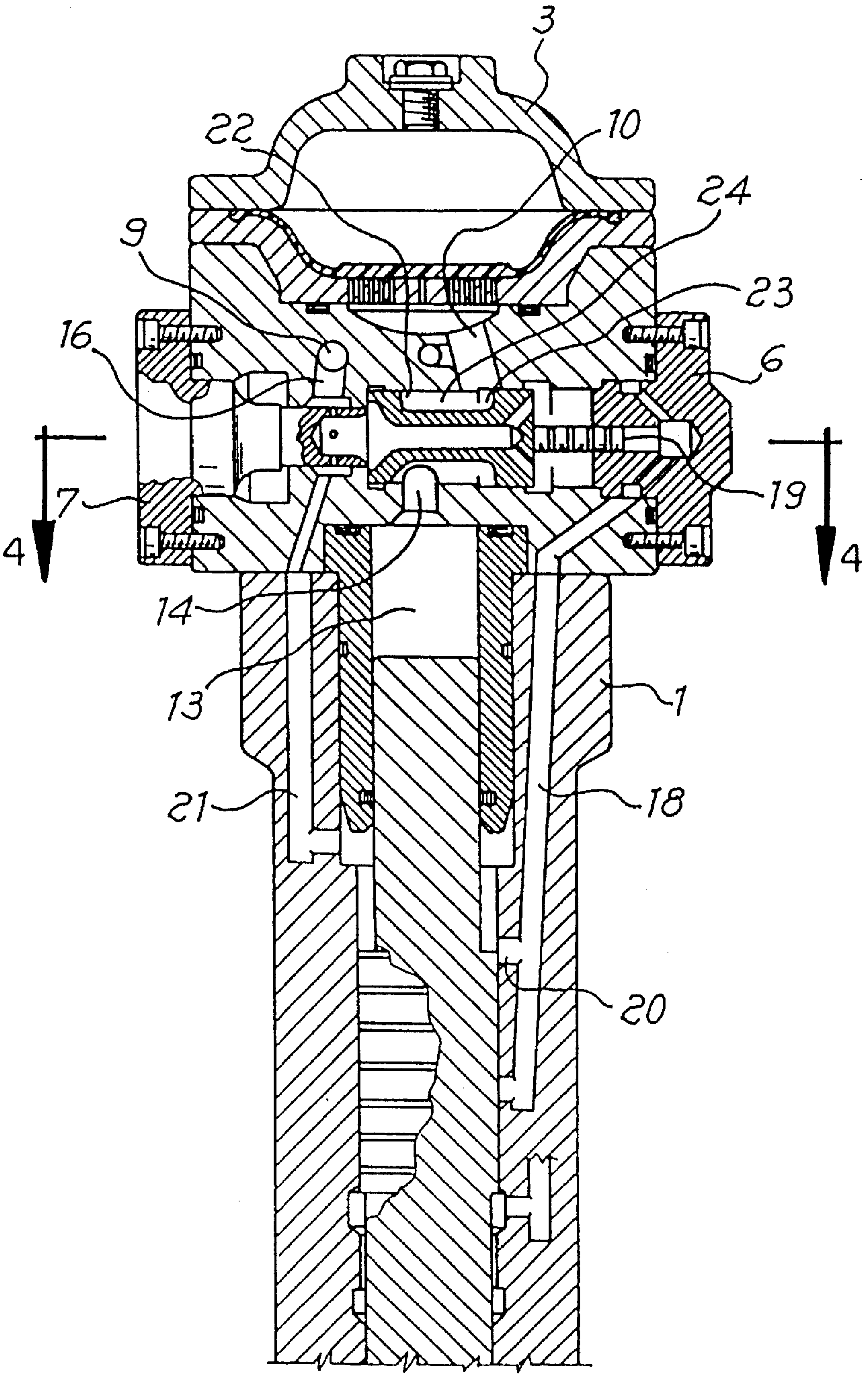
FIG. 2 is a view similar to the preceding one, with the ram at the bottom dead center.

During the return travel, the oil contained in the blast chamber 13 is drained through a blast duct 14, located at the top of cylinder 1, connected to the drain hole 9 through holes 15 in shutter 7 and a drain duct 16, as it will be better explained further on. When ram 4 has almost reached the end of the return travel, it uncovers a first outflow orifice 17. Said orifice 17 allows the outflow of the oil under pressure along a switch duct 18 up to cap 6, where the oil acts on the head surface 19 of shank *5a* of shuttle 5 thus causing the shifting thereof to the left, as in FIG. 2.

Referring to said figure, there is seen that this shifting of shuttle 5 connects accumulator 3 to the blast chamber 13 through the inlet duct 10 and the blast duct 14. In this way, the oil under pressure present in the accumulator flows down rapidly thus pushing violently downwards ram 4 which strikes the tool. During the descending travel, ram 4 uncovers a second outflow orifice 20 connected to the switch duct 18. This orifice 20 allows the outflow into cylinder I of the oil under pressure still present in cap 6. During the subsequent return travel, this oil is drained through a discharge duct 21 connecting the central part of cylinder 1 directly to the drain hole 9, through the drain duct 16.

Figure 3:
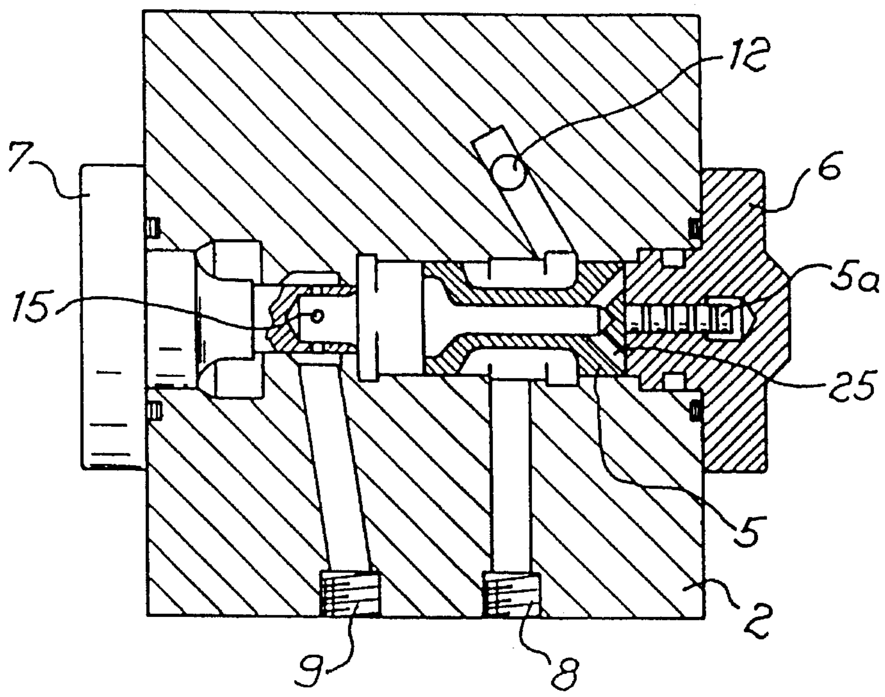
FIG. 3 is a cross-sectional view along line 3—3 of FIG. 1.

Due to the absence of pressure on head 19 of shank *5a*, shuttle 5 shifts again to the right. This occurs because shuttle 5 has an annulus-shaped left inner surface 22 whose area is smaller than that of a corresponding annulus-shaped right inner surface 23. Therefore, the feed pressure permanently acting in the chamber 24 of shuttle 5 causes the rightwards shifting in the absence of the leftwards push on head 19 of shank *5a*, which has an area greater than the difference between the area of surface 22 and that of surface 23. In this way, shuttle 5 shifts back to the right thus connecting again the feed hole 8 to the return duct 12, as shown in FIG. 3, so as to make ram 4 reascend and start a new cycle.

It should be noted that the time required for reascending, and therefore also the charge time of accumulator 3, depends on the drain speed of the oil from the blast chamber 13, the feed pressure being set. As explained above, this takes place through shutter 7 which has a row of holes 15 whose cross-section defines the oil outflow time. As a consequence, the pressure of the oil in accumulator 3 and therefore the highest operating pressure of the hydraulic hammer are defined.

Figure 4:
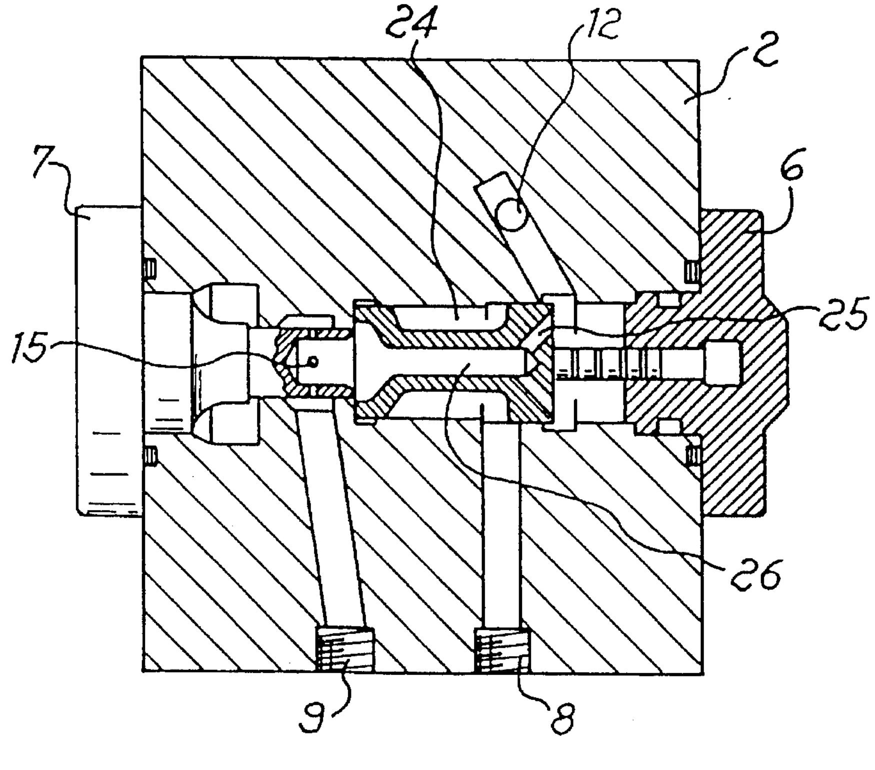
FIG. 4 is a view similar to the preceding one, along line 4—4 of FIG. 2; and FIG. *5a*, *5b* and *5c* are partial views similar to the preceding one, which show three embodiments of a mechanism for adjusting the drain rate.

Referring to FIG. 4, there is also seen that when shuttle 5 is positioned on the left (blast step) not only the feed to the return duct 12 is interrupted, but the latter is also connected to holes 15. This takes place through ducts 25 formed at the right end of shuttle 5 and through an inner cavity 26 thereof. In this way, the descending of ram 4 is not slowed by the oil remaining in the lower part of cylinder 1, since it is free to flow out therefrom through hole 9 by flowing up along duct 12.

Figure 5A:
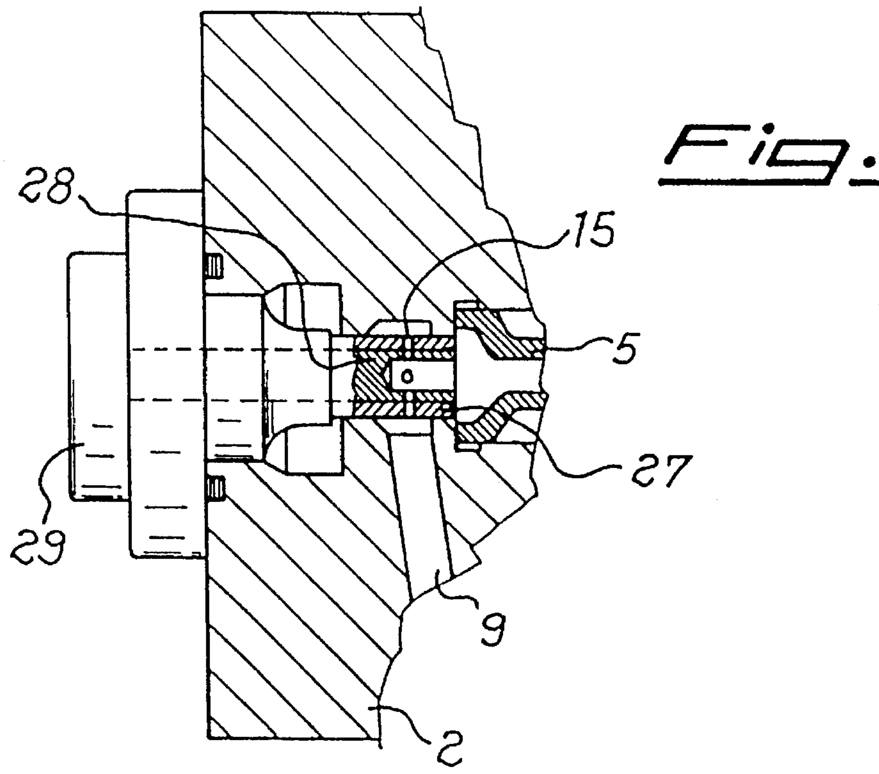
Figure 5B:
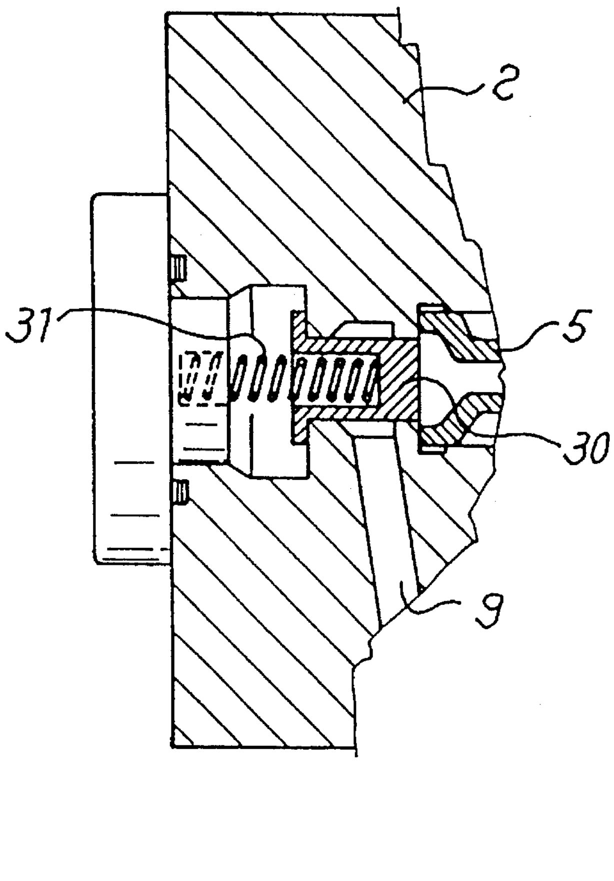
Figure 5C:
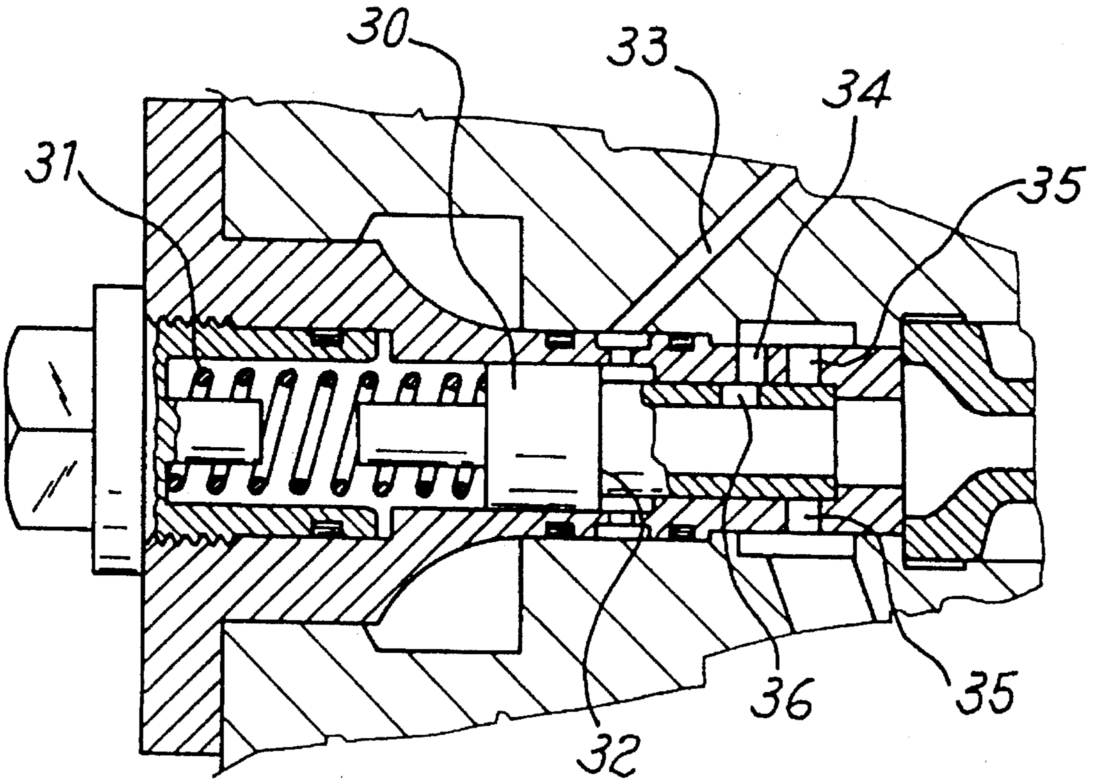

Finally referring to FIGS. 5*a*–5*c*, there are shown three embodiments of a variable-section shutter. In the first type of FIG. 5*a*, the shutter consists of a fixed outer cylinder 27 and a mobile inner cylinder 28 coaxial thereto. Holes 15 are formed on both cylinders in corresponding positions, whereby it is possible to adjust the passage section of the oil flowing out towards hole 9 by rotating the inner cylinder 28 through an external knob 29. The second type of FIG. 5*b* has a small mobile piston 30 on which a pushing spring 31 acts to oppose its leftwards shifting when the pressure of the outflowing oil acts thereon. In order to adjust the drain rate it is sufficient to employ springs of different strength and/or to change the pre-compression of the spring, possibly through an external control or by inserting spacers in the seat of spring 31.

The third type of FIG. 5*c* is similar to the preceding one, but it takes into consideration the fact that oil viscosity decreases when the temperature increases whereby, with the same shutter section, the oil drain is faster and therefore the operating pressure decreases. In order to keep said pressure constant, piston 30 is provided with an annulus 32 on which the oil under pressure coming from accumulator 3 acts through a duct 33, and the pushing spring 31 is stronger. In this way, the piston shifting depends mainly (e.g. at 80%) on the pressure reached inside accumulator 3, and to a much smaller extent on the pressure of the outflowing oil as in the solution of FIG. 5*b*. Therefore, the change in the oil viscosity has a little influence on the top operating pressure reached.

Furthermore, this third type of shutter has another modification for preventing the hammer from carrying out some additional cycles due to the residual pressure in the accumulator after the feed has been cut. In fact, the shutters shown in FIGS. 4 and 5*a* have a permanent connection between the inner cavity 26 of shuttle 5 and drain 9 through holes 15, whereby the oil leaking from chamber 24 between shuttle 5 and the seat thereof can be drained. On the contrary, this is not possible in the shutter of FIG. 5*b*, so that the residual pressure causes 5–6 additional shots. In order to prevent this, a further hole 34 is provided behind the drain holes 35 which are uncovered by the mobile piston 30 when it shifts leftwards. Said piston 30 has a hollow front portion with a hole 36 which, in the position shown in FIG. 5*c* (piston 30 on the right), allows the outflow of the leaking oil through hole 34, thus re-establishing the permanent connection to drain 9.

It is clear that the above-described and illustrated embodiment is just an example susceptible of changes concerning, for example, shutter 7 or the shape of surfaces 19, 22, 23 of shuttle 5 on which the oil under pressure acts.

I claim:

1. A device for distributing oil under pressure including a head (2) within which, inside a chamber (24), a shuttle (5) slides provided with a shank (5*a*) sealingly sliding within an end cap (6) of said head (2) and on whose head surface (19) oil at the feed pressure acts coming from a switch duct (18) formed in said cap (6), characterized in that the head (2) is provided with a feed hole (8) connected to said chamber (24) and with a drain hole (9), the head (2) being closed at the other end by a shutter (7) connected to said drain hole (9), and in that the shuttle (5) is provided with an inner cavity (26) connected to said shutter (7) and to one or more ducts (25) formed at the end where the shank (5*a*) is located, said shuttle (5) being shaped so as to have in the chamber (24) first and second opposite transverse inner surfaces (22, 23) each having an area, the second surface (23) being located at the end where the shank (5*a*) is located, with the area of the second surface (23) being greater than the area of the first surface (22), and the difference between the areas of the first and second surfaces (22, 23) being smaller than an area of the head surface (19) of the shank (5*a*).

2. A distribution device according to claim 1, characterized in that the shutter (7) is provided with means for adjusting the passage section.

3. A distribution device according to claim 2, characterized in that the shutter (7)includes a fixed outer cylinder (27) and a mobile inner cylinder (28) coaxial thereto, one or more holes (15) being formed on both cylinders in corresponding positions, said inner cylinder (28) being rotated by means of an external knob (29).

4. A distribution device according to claim 2, characterized in that the shutter (7) includes a small mobile piston (30) with a pushing spring (31) acting thereon which opposes its shifting during the drain step.

5. A distribution device according to claim 4, characterized in that the mobile piston (30) is provided with an annulus (32) on which oil under pressure coming from an accumulator (3) acts through a duct (33), as well as with an inner cavity having a hole (36) connected to the drain (9) when the shutter (7) is in the closed position.

6. A hydraulic hammer including an accumulator (3) for oil under pressure and a cylinder (1) wherein a ram (4) slides with a reciprocating motion, said cylinder (1) being provided with a return duct (12) and a blast duct (14), characterized in that it further includes a distribution device according to claim 1 which is positioned between the accumulator (3) and the cylinder (1) and alternately connects said blast duct (14) to the accumulator (3) and to the shutter (7), the cylinder (1) being provided with a pair of outflow orifices (17, 20) located so that the first orifice (17) is uncovered by the ram (4) at the end of the return travel and the second orifice (20) is uncovered by the ram (4) at the end of the descending travel, the return duct (12) being alternately connected to the ducts (25) of the shuttle (5) of the distribution device.

* * * * *